N. D. LAMB.

Alarm Whistle.

No. 1,490. Reissued June 2, 1863.

WITNESSES

Harry W. Prat

J. P. Little

INVENTOR

Ayres D. Lamb

Ashel Clark

By atty A. R. Houghton

N. PETERS, Photo-Lithographer, Washington, D. C.

UNITED STATES PATENT OFFICE.

NOYES D. LAMB AND ANSEL CLARK, NORWICH, CONNECTICUT, ASSIGNEES OF NOYES D. LAMB.

IMPROVEMENT IN ALARM-WHISTLES.

Specification forming part of Letters Patent No. 33,437, dated October 8, 1861; Reissue No. 1,490, dated June 2, 1863.

*To all whom it may concern:*

Be it known that NOYES D. LAMB, of Norwich, in the county of New London and State of Connecticut, did invent a new and useful Improvement in Air-Whistles, for which he received Letters Patent, dated October the 8th, 1861, said Letters Patent being now the joint property of NOYES D. LAMB and ANSEL CLARK; and we do hereby declare that the following is a full and exact description of the same, reference being had to the accompanying drawings, making a part of this specification, and to the letters of reference marked thereon, in which—

Figure 1:
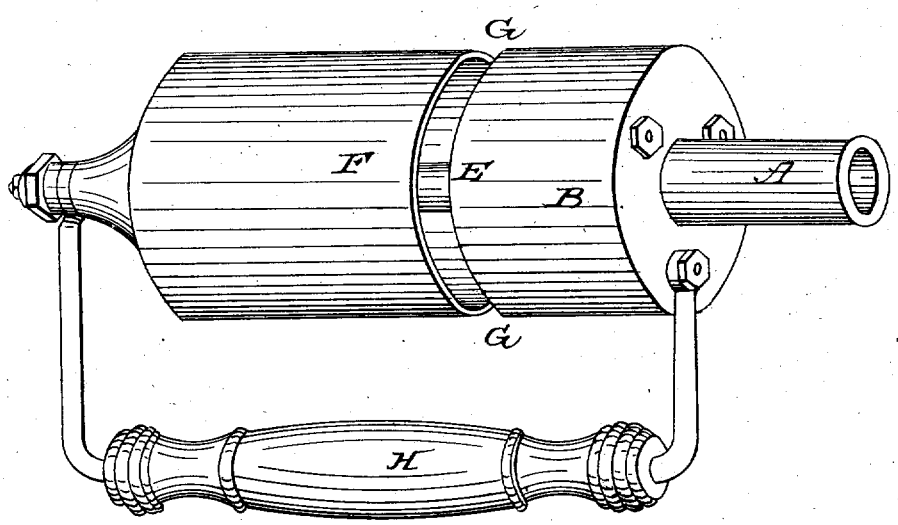
Figure 1:
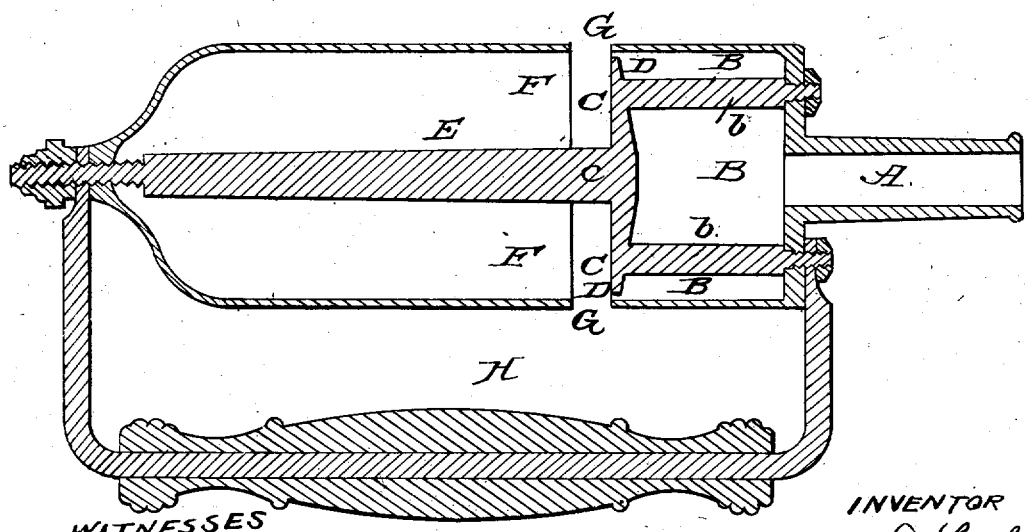

Figure 1 represents in perspective the air-whistle. Fig. 2 represents a longitudinal vertical section through the same, to show its interior construction.

The improved air-whistle may be made of tin, brass, or any other metallic substance, and is designed for use by sailing-vessels in cases where darkness, snow-storms, or heavy fogs may make it necessary to have means ready at hand for giving alarm-signals as a precaution against collisions. When a greater volume of sound is required than could be produced by the mouth of the user, the whistle may be used in connection with an air-pump, which will give the advantage of regular signals at short intervals by simply turning a cock.

The nature of the invention consists in the hereinafter-described combination of devices, for the purpose of producing sounds for signals or alarms by forcing air through the whistle with the mouth or with an air-pump, and is designed for use by sailing-vessels.

To enable others skilled in the art to make and use the invention, we will proceed to describe its construction and operation.

In the drawings, A is a tubular mouth-piece, through which the air is forced into the hollow cylinder B, to which the mouth-piece is attached.

B is a hollow cylinder or receiver, and is fastened on the inside to the sounding-plate C by three bolts, *b*.

Steam-whistles, which the air-whistle resembles in appearance, are made with a hollow perforated tube for admitting steam to the whistle. Such a whistle cannot be blown loudly by the mouth or by air, and only by the use of steam for which it is specially adapted.

The receiver B of the air-whistle, by being constructed without the hollow perforated tube, (which is indispensable in steam-whistles,) is adapted to the capacity of the lungs, thereby producing a volume of sound which could only be made in the steam-whistle by the more powerful agency of steam. By letting the air into the receiver of the air-whistle, without the hollow perforated tube used in steam-whistles, a new effect is produced—to wit: an increased volume of sound, sufficient for marine signals. A similar effect, with the same agency, cannot be produced on a steam-whistle.

C is the sounding-plate, supported at the center by the standard E. The sounding-plate is fitted into the bottom of the receiver in such a way as to form a continuous aperture, D, between the circumference of the plate and the rim of the receiver, through which aperture the thin stratum of forced air passes into the bell or sounding-cup F from the receiver or cylinder B.

E is the standard secured at one end, *a*, to the bottom of the sounding-cup, and at the other end, *c*, to the sounding-plate C, for the purpose of connecting them together. The sounding-cup or bell F is so placed as to admit the air from the receiver and allow the same to escape, aidng thereby in the production of sound. The sounding-cup F may be so secured to the standard as to slide on the same, for the purpose of varying the sound, increasing or diminishing the size of the outlet G having that effect.

H is a handle by which the whistle may be held when blown by the mouth.

What is claimed in the construction of air alarm-whistles as the invention of NOYES D. LAMB is—

The combination of the mouth-piece, receiving-cylinder, and sounding-cup or bell, constructed and operating together substantially as herein described.

NOYES D. LAMB,
ANSEL CLARK.

Witnesses:
HIRAM B. CROSBY,
DAVID YOUNG.